United States Patent [19]
Chu et al.

[11] Patent Number: 5,992,087
[45] Date of Patent: *Nov. 30, 1999

[54] WHITEFLY TRAP

[75] Inventors: Chang-Chi Chu, El Centro, Calif.; Thomas J. Henneberry, Tempe, Ariz.

[73] Assignee: The United States of America as represented by the Secretary of Agriculture, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 08/779,066

[22] Filed: Jan. 7, 1997

[51] Int. Cl.⁶ .................................................. A01M 1/10
[52] U.S. Cl. .................................................. 43/122
[58] Field of Search .............................. 43/122, 113, 107

[56] References Cited

U.S. PATENT DOCUMENTS

| | | | |
|---|---|---|---|
| 983,977 | 2/1911 | Lilge | 43/122 |
| 1,053,714 | 2/1913 | Crichton | 43/122 |
| 1,786,704 | 12/1930 | Deibele | 43/122 |
| 3,748,777 | 7/1973 | Bradshaw et al. | 43/114 |
| 4,069,615 | 1/1978 | Gilbert | 43/107 |
| 4,217,723 | 8/1980 | Hrebec | 43/122 |
| 4,244,135 | 1/1981 | Harwoods | 43/122 |
| 4,551,941 | 11/1985 | Schneidmiller | 43/122 |
| 5,090,153 | 2/1992 | Mullen et al. | 43/114 |
| 5,231,792 | 8/1993 | Warner | 43/122 |
| 5,243,781 | 9/1993 | Carter | 43/122 |
| 5,309,668 | 5/1994 | Barton | 43/121 |
| 5,392,560 | 2/1995 | Donahue et al. | 43/122 |
| 5,461,822 | 10/1995 | Green et al. | 43/122 |
| 5,522,171 | 6/1996 | Mandeville | 43/122 |
| 5,557,880 | 9/1996 | Schneidmiller | 43/122 |
| 5,596,833 | 1/1997 | Harrie et al. | 43/122 |
| 5,682,706 | 11/1997 | Altenburg | 43/122 |
| 5,842,305 | 12/1998 | Liao | 43/122 |

OTHER PUBLICATIONS

Trappit Dome Trap Assembly Instructions, AgriSense (no date).

Chu et al, "*Bemesia argentifolii* (Homoptera: Aleyrodidae): Host Preference and Factors Affecting Oviposition and Feeding Site Preference", Apr. 1995, Environmental Entomology, vol. 24(2):354–360, 1995.

*Primary Examiner*—Michael J. Carone
*Assistant Examiner*—Darren Ark
*Attorney, Agent, or Firm*—M. Howard Silverstein; Nancy J. Parsons; Margaret A. Connor

[57] ABSTRACT

A simple, lightweight, reusable three element trap for attracting and capturing flying insects, especially whiteflies, consists of a transparent enclosure attached to a yellow base with a truncated cone shaped interior for admitting flying insects into the transparent enclosure, and a deflector plate suspended over the top opening of the base to impede the insects' flying out of the trap. The trap does not require bait or adhesives. The flying insects are attracted to the yellow base, land and crawl inside, where they are attracted to the light passing through the transparent enclosure. The insects attempt to fly away, and become trapped inside the trap.

12 Claims, 3 Drawing Sheets

# WHITEFLY TRAP

BACKGROUND OF THE INVENTION

1. Field of the Invention

This invention concerns a lightweight, reusable, convenient insect monitoring and trapping device for capturing flying adult insects, particularly whiteflies. In the preferred embodiment, the trap is a three element snap together unit which is not sticky and does not require bait. The trap is designed to exploit behavioral and flight characteristics to trap the insects.

2. Background of the Invention

Various traps and devices are available for capturing flying insects. However, most traps require the use of adhesives or bait or attractants, which are messy and must be replaced often. Many of the traps are complicated and difficult to manufacture inexpensively. For example, U.S. Pat. Nos. 5,392,560 and 5,461,822 describe traps for flying insects which require bait or a pheromone attractant to lure the insects to the trap. U.S. Pat. No. 5,090,153 requires both bait and an adhesive area to trap the insects. Yellow sticky card traps are commonly used for monitoring adult whitefly activity in the field and for control of whitefly populations in greenhouses. Disadvantages of sticky card traps include the tendency of the trap's adhesive to become clogged with non-target insects and dust, sticky card traps are not reusable, the adhesive is messy and difficult to handle, a microscope must be used as an aid to count the trapped small insects such as whiteflies, and specimens are distorted and cannot be used for further taxonomic study, or molecular genetic analysis.

Whiteflies are distributed worldwide in tropical and subtropical areas as well as temperate zones (Byrne et al. 1990). There are 37 species identified in the Bemisia genus (Mound & Halsey 1978). *Bemisia tabaci* (Gennadius) is one of the most serious economic pests attacking over 300 species of plants. The newly described species *Bemisia argentifolii* Bellows & Perring (Bellows et al. 1994) probably first found in Florida (Harmon & Salguero 1987) has an even wider host range and is more prolific than B. tabaci (Gill 1992). The economic losses caused by the new species in the three year period from May 1991 to April 1994 in the Imperial Valley, California alone was close to 1 billion dollars (Birdsall et al. 1995). Beltwide cotton losses due to *B. argentifolii* colonization was estimated at about 16,000 bales in 1994 (Williams 1995). Further, lint quality was reduced because of stickiness and associated sooty-mold (Cladosporium spp.) development. This new strain or a new species has an expanded host range and attacks numerous commercially grown crops as well as ornamentals and many weed hosts (Perring et al. 1993, Bellows et al. 1994). This has made it particularly difficult to control. For example, in the desert cultivated crop-growing areas of Arizona and California, sequential planting of cole crops, curcurbits, cotton, and alfalfa offers a continuum of year-round susceptible host material and the opportunity for whiteflies to move within and among cropping systems to expand population development. Control methods for the new species are urgently needed.

Basu (1995) indicated that color may be the only factor in B. tabaci host location. Berlinger (1986) found *B. tabaci* attracted to a yellow incandescent bulb. Mound (1962) reported *B. tabaci* was attracted to two wavelengths of transmitted light, the blue/ultra-violet and the yellow area of the spectrum. Other whitefly species such as Trialeurodes abutilonea are also attracted to yellow (Lloyd 1921). Vernon and Gillespie (1990) noted that a yellow pigment with high reflective intensity around 550 nm effectively attracted *T. vaporariorum*. These results have led to the use of yellow sticky card traps (Olson Products, Inc., Medina, OH) for monitoring whitefly population densities (e.g. Heinz et al. 1992, Natwick et al. 1995) and yellow plastic mulches for crop protection from whiteflies (Berlinger et al. 1983). In laboratory studies of *B. argentifolii* feeding behavior, we found that adults initially flew from host leaves toward light, but after landing on new host leaves, they walked to shaded areas, usually the undersides of leaves (Chu et al. 1995). Based on this behavior and yellow color orientation, we developed a whitefly trap that can be used for monitoring adult density under field conditions and for adult control in greenhouses. We refer to our whitefly trap as the CC trap.

SUMMARY

Based on the behavioral characteristics of Bemisia spp., we have designed a non-sticky, unbaited trap for attracting and capturing adult whiteflies to monitor occurrence and density in the field and greenhouse. The whitefly trap catches reflect seasonal activity, seasonal population increases and density differences of adult populations in field plots under different treatment regimes. The preferred embodiment of the trap is a simple three-element device which can be easily and inexpensively manufactured by well-known plastic molding techniques.

The trap includes a transparent enclosure, a colored opaque base which is attractive to whiteflies and a deflector plate with supports. The point of novelty is the deflector plate which functions to inhibit insects from flying out of the trap and to prevent insects which die inside from falling out of the trap through the bottom opening in the base. Another unique feature of the deflector plate is that it is constructed of transparent material which does not interfere with whitefly phototactic response to ambient light entering the top of the trap and inducing whiteflies to enter the trap. A means of hanging the trap may be attached to the top of the transparent enclosure.

DETAILED DESCRIPTION OF THE INVENTION

Figure 1:
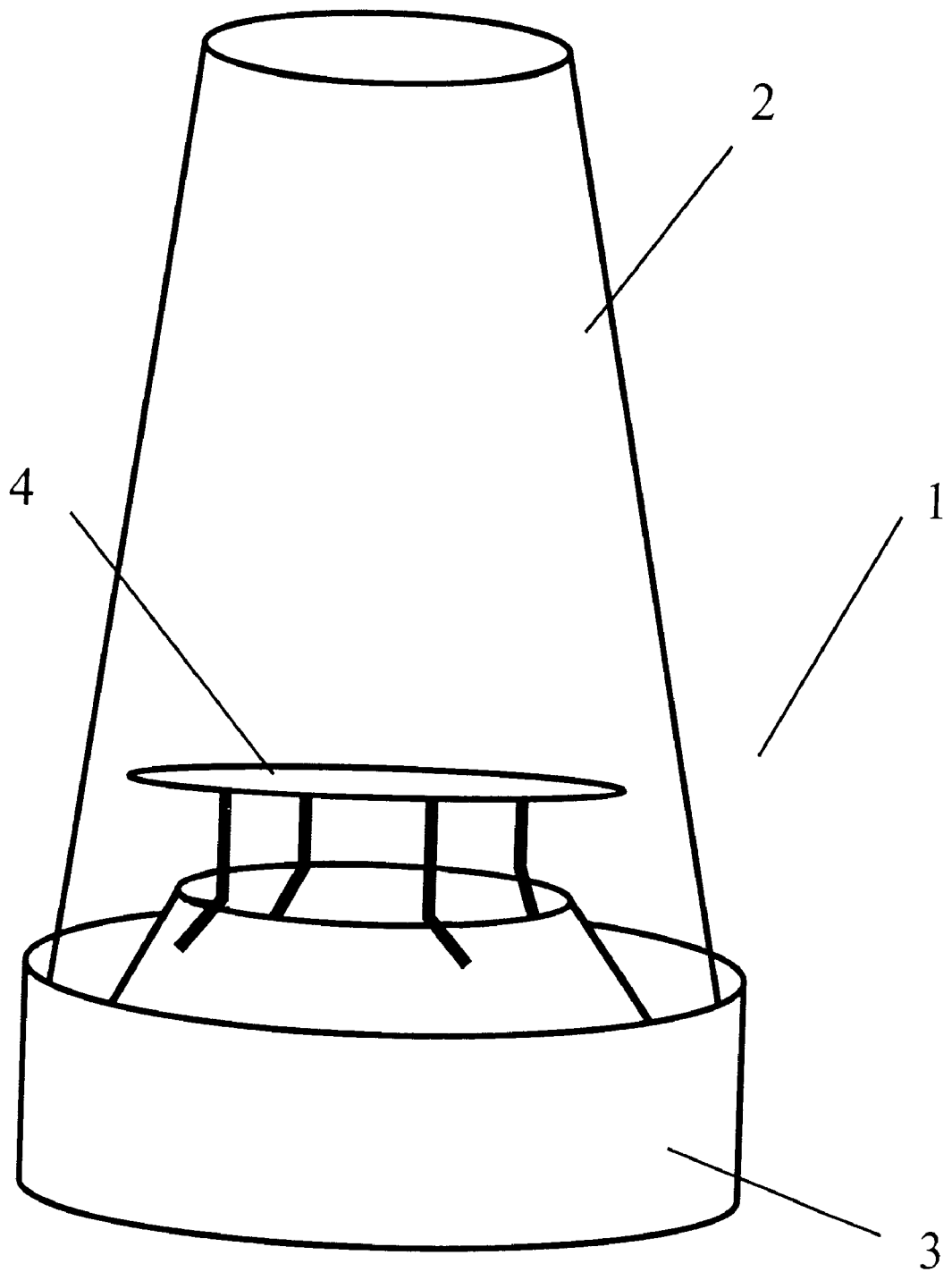
FIG. 1 is a perspective view of an assembled trap.
Figure 2:
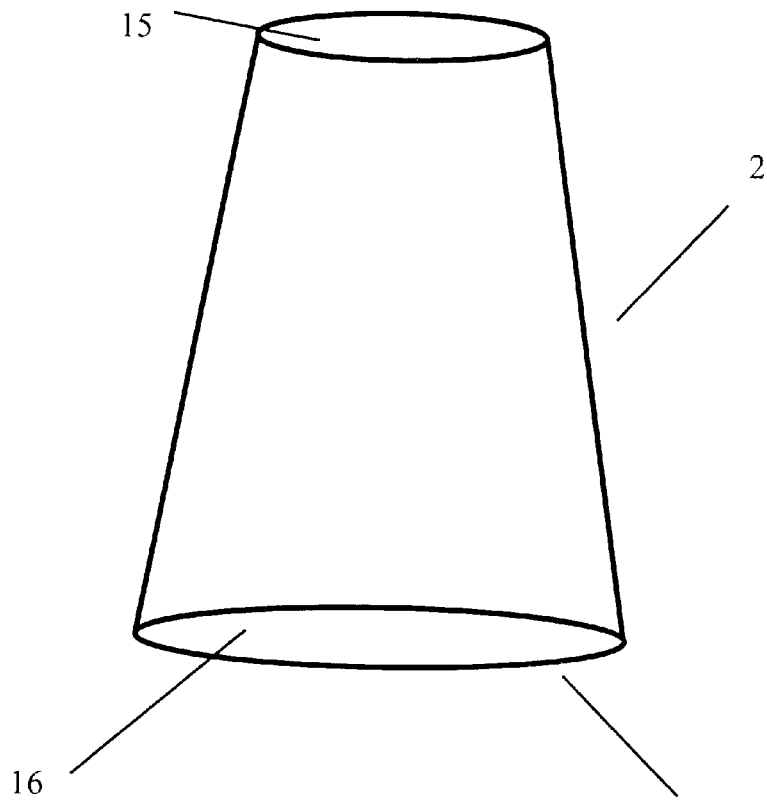
FIG. 2 is a perspective view of the upper enclosure.
Figure 3:
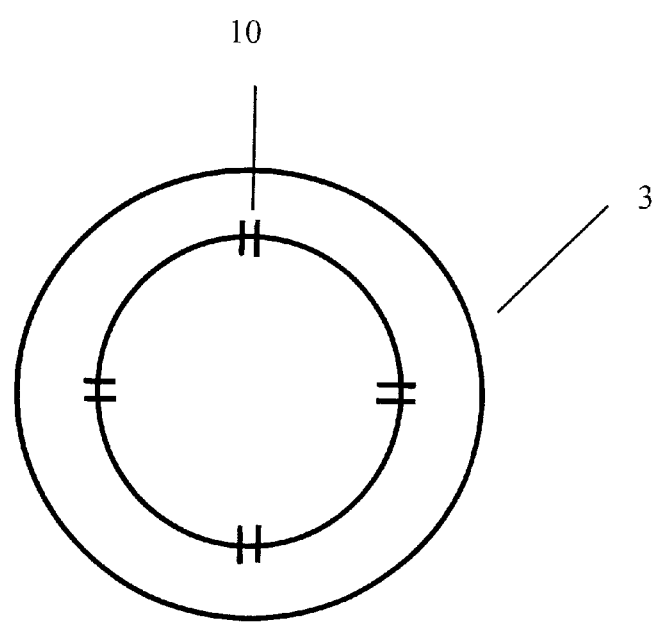
FIG. 3 is a top view of the base.
Figure 4:
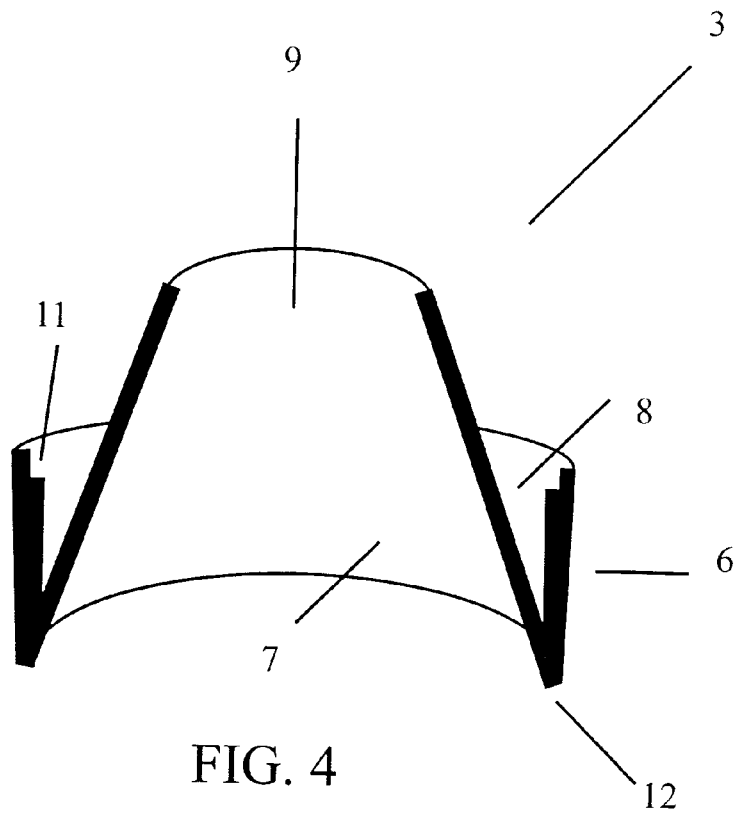
FIG. 4 is a cross-sectional view of the base.

FIGS. 1–5 illustrate the instant invention. FIG. 1 is a perspective view of the assembled trap. The trap 1 comprises three elements: an upper enclosure 2, a base 3 and a deflector plate 4. The elements are preferably detachable. The trap is made of a lightweight but durable material preferably plastic. FIG. 2 illustrates the upper enclosure 2, which in the preferred embodiment is a hollow cone with a closed top 15, bottom opening 16 and is transparent to allow ambient light to pass through. The bottom of the enclosure 2 has a rim 14 which defines opening 16 and which fits into a groove 11 in the outer wall of the trap base. The trap base 3 is illustrated in FIGS. 3 and 4 and is opaque and of suitable color to attract whiteflies, preferably yellow. A green colored base may be used for attracting and trapping green leafhoppers. An upwardly and inwardly extending hollow truncated cone 9 is formed integrally with the annular rim 12 that forms the bottom opening of the trap base 3. The apex of the truncated cone 9 is open to permit passage of ambient light and insects. When the trap is assembled, the apex of the base cone is inside the transparent enclosure 2. In the preferred embodiment illustrated in FIG. 1 the base cone and the transparent enclosure share a common access. The annular rim 14 of the transparent enclosure fits into a groove 11 in the outer wall of the base. Elevated over the trap base 3 is a deflector plate 4 which is attached to the base by supports 5.

Figure 5:
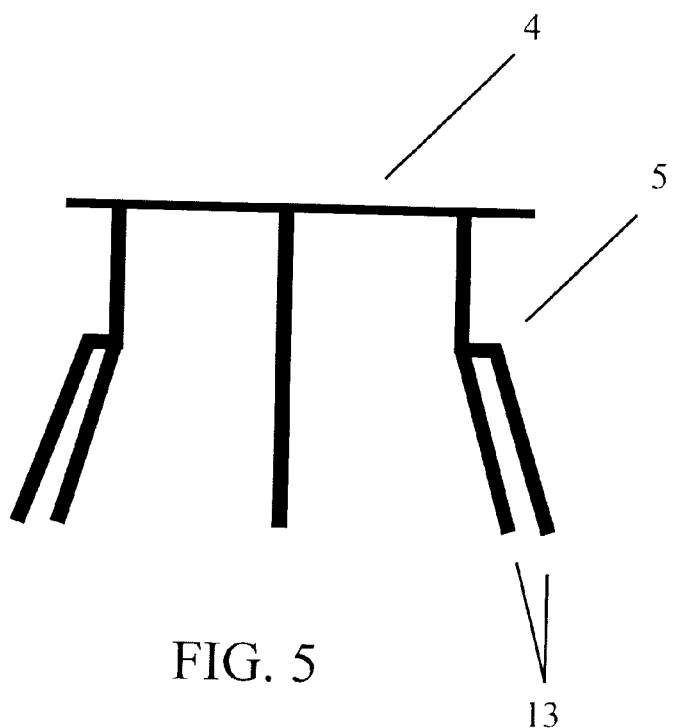
FIG. 5 is a side view of the deflector plate with supports.

FIG. 3 is a top view of the base 3. There are four grooves 10 in the inner wall of the trap base into which the deflector plate supports 5 are inserted. FIG. 5 is a side view of the deflector plate 4 with supports 5. The two legs 13 of each support are angled to fit into the grooves 10 on the inner wall of the trap base. In another embodiment, the supports 5 and deflector plate 4 are separate elements. The deflector plate may have holes or indentations into which the top of the support fits. When the trap is assembled, the outer edge of the deflector plate extends beyond the apex of the base, but does not contact the walls of the transparent enclosure. Therefore, the deflector plate has a diameter greater than the diameter of the apex of the base cone, and less than the diameter of the transparent enclosure 2.

In alternative embodiments, the upper enclosure may be a transparent hollow cylinder with a closed top and a bottom opening. The upper enclosure may be a cone coming to a point at the top. The base may be a truncated cone, the upper edge of which attaches to the bottom opening of the upper enclosure.

In the preferred embodiment, the trap base is opaque yellow and the trap top is a transparent cone. The base and cone snap together and can be separated to remove the whiteflies so the trap can be reused. The supports on the deflector plate fit over the inner truncated cone of the base, creating a space between the top opening of the base and the deflector plate. The supports for the deflector plate may be permanently mounted on the plate. In another embodiment, the supports are separate elements and snap into holes in the deflector plate.

The design of the CC whitefly trap takes into consideration certain behavioral characteristics of the whitefly. Whiteflies are attracted to the color yellow. Upon landing, the whiteflies crawl underneath the object on which they have landed. When whiteflies land on the outer wall 6 of the trap base, they crawl under the rim 12 and up the inside wall of the base 7. When they reach the top opening of the base, they are attracted to the light passing through the transparent enclosure and deflector plate and try to fly away toward the trap top. The deflector plate covers the open apex of the trap base 9, thus inhibiting the flies from flying or falling out of the trap. When the flies die, they fall into the trough 8 formed between the inner and outer walls of the base.

Unexpected and unique advantages of the CC whitefly trap are that it does not trap parasites of the whitefly and is more efficient at trapping adult whiteflies than yellow sticky cards. It is a common practice in greenhouses to use parasites to control whitefly nymphs. However, the parasites do not attack adult whiteflies, so yellow sticky cards are generally used in addition to the parasites for control of both nymph and adult whiteflies. The disadvantage of using the sticky cards is that they attract and trap the parasites. In a test conducted in an untreated cotton field, the CC whitefly trap captured adult whiteflies, but no parasites. See example 2. The yellow sticky cards, however, trapped both adult whiteflies and parasites. The CC whitefly trap can therefore be used in conjunction with parasites for total control of whitefly nymphs and adults under greenhouse conditions.

EXAMPLE 1

A test was conducted to compare the present invention (CC whitefly trap) to a similar design without the deflector plate. The traps were tested in cotton fields in Brawley, Calif. As shown in Table 1, the CC whitefly trap with the deflector plate trapped significantly higher numbers of whitefly adults than the trap without the deflector plate. The inclusion of the deflector plate in the CC trap inhibits the whiteflies from flying out of the trap and prevents dead flies from falling out of the trap.

TABLE 1

| Trap Design | No. Adults/trap/4 hours |
| --- | --- |
| CC trap without plate | 42.1 ± 5.3 |
| CC trap with plate | 88.8 ± 15.5 |

EXAMPLE 2

A test was conducted to compare the present invention (CC whitefly trap) to commercially available yellow sticky traps for trapping two native parasites of whiteflies. The traps were tested in an untreated cotton field in Brawley, Calif. As shown in Table 2, the CC whitefly trap did not trap the native parasites, while the yellow sticky trap trapped Eretmocerus males and females. This indicates the CC whitefly trap may be used as a supplementary control device in the greenhouse where parasites are released for the control of whitefly nymphs. The use of the CC whitefly trap and parasites would achieve total control of adult and nymph stage whiteflies.

TABLE 2

| | No. adults/trap/24 h | | | | |
| --- | --- | --- | --- | --- | --- |
| Trap type | Whitefly | Encarsia male | Encarsia female | Eretmo-cerus male | Eretmo-cerus female |
| CC trap | 43.7 ± 9.2 | 0.0 ± 0.0 | 0.0 ± 0.0 | 0.0 ± 0.0 | 0.0 ± 0.0 |
| Yellow sticky trap | 21.0 ± 4.7 | 0.0 ± 0.0 | 0.0 ± 0.0 | 0.3 ± 0.0 | 27.0 ± 3.6 |

EXAMPLE 3

A test was conducted to determine the optimal height from bare ground to place the traps. The test was set up to either give the whiteflies a choice of trap height or no choice. In the "choice" part of the test, one stake was placed in the field and traps were hung at 15, 30, 45, 60 and 75 cm above the bare ground on the single stake. In the "no choice" part of the test, five stakes were placed in the field, 30 feet apart, each stake having one trap hung at a different height above the bare ground. As shown in Table 3, whether or not the whiteflies had a choice of trap heights, the optimal height was 15 cm above bare ground for placing the CC whitefly traps.

TABLE 3

| | Optimal Trap Height | |
| --- | --- | --- |
| Choice type | Trap height (cm) | No. adults/trap/24 h |
| No choice | 15 | 32.24 ± 2.01 |
| | 30 | 18.46 ± 1.22 |
| | 45 | 15.15 ± 0.96 |
| | 60 | 11.37 ± 0.69 |
| | 75 | 10.63 ± 0.69 |
| Choice | 15 | 19.25 ± 0.99 |
| | 30 | 12.54 ± 0.90 |
| | 45 | 8.67 ± 0.55 |

TABLE 3-continued

| | Optimal Trap Height | |
|---|---|---|
| Choice type | Trap height (cm) | No. adults/trap/24 h |
| | 60 | 7.89 ± 0.50 |
| | 75 | 8.46 ± 0.56 |

EXAMPLE 4

A test was conducted to compare the CC whitefly trap to the Trappit™ Dome Trap (AgriSense). As shown in Table 4, the CC whitefly trap captured significantly more whiteflies than the Trappit™ Dome Trap at all whitefly population densities tested.

TABLE 4

Mean number of adults/trap/week

| Month Trap Type | week one | week two | week three | week four |
|---|---|---|---|---|
| June | | | | |
| CC | 4.63 ± 1.36 | 2.86 ± 0.88 | 7.45 ± 1.75 | 3.60 ± 1.04 |
| Dome | 1.13 ± 0.54 | 0.70 ± 0.24 | 0.50 ± 0.31 | 1.13 ± 0.28 |
| July | | | | |
| CC | 8.31 ± 1.67 | 8.38 ± 1.53 | 26.34 ± 7.03 | 49.03 ± 18.96 |
| Dome | 1.43 ± 0.40 | 3.68 ± 0.87 | 3.20 ± 0.72 | 2.40 ± 0.43 |
| August | | | | |
| CC | 59.07 ± 17.15 | 24.48 ± 9.10 | 35.17 ± 8.72 | 29.69 ± 9.31 |
| Dome | 3.21 ± 0.83 | 2.81 ± 0.72 | 3.17 ± 0.71 | 3.70 ± 1.51 |
| September | | | | |
| CC | 29.76 ± 9.66 | 26.83 ± 4.96 | 9.24 ± 2.47 | 13.17 ± 2.78 |
| Dome | 2.41 ± 0.63 | 4.21 ± 1.01 | 2.63 ± 0.97 | 1.43 ± 0.44 |
| October | | | | |
| CC | 14.61 ± 5.15 | 46.07 ± 13.26 | 22.20 ± 8.58 | 1.79 ± 0.38 |
| Dome | 2.07 ± 0.93 | 2.43 ± 0.60 | 1.67 ± 0.62 | 0.57 ± 0.18 |

We claim:

1. An insect trap and monitoring device for whiteflies comprising:

(a) a base including a cone-shaped member having a top opening and a bottom opening, wherein the top opening is smaller than the bottom opening; wherein said bottom opening is defined by a rim at the bottom of said cone-shaped member;

(b) a transparent wall at least partly surrounding said cone-shaped member and, together with said cone-shaped member, defining an enclosure;

(c) a substantially solid transparent deflector plate within said enclosure above the top opening of said cone-shaped member to permit passage of light through said top opening, said deflector plate having a diameter greater than the diameter of the top opening of the base;

wherein said trap has an outer surface that is of a color which attracts whiteflies to land thereon; wherein said outer surface is directly connected to said rim; wherein said outer surface is above said rim so that whiteflies land thereon and crawl downward and under said rim, and thereafter are attracted to said light passing through said top opening whereby said whiteflies fly upward into said enclosure; wherein said deflector plate extends over and beyond the top opening of said cone-shaped member and is spaced from said transparent wall and inhibits said whiteflies from flying or falling out of said enclosure.

2. The insect trap of claim 1 which is unbaited.

3. An insect trap and monitoring device for whiteflies comprising:

(a) an opaque base of suitable color to attract whiteflies, said base having a truncated cone shaped inner wall having a lower edge and an upper edge which forms a top opening, said base having an annular outer wall formed integrally at its lower edge with said lower edge of said inner wall to form a bottom opening, wherein said top opening is smaller than said bottom opening, and wherein said outer wall extends upward from the bottom to form a trough between said inner and outer walls;

b) a transparent upper enclosure with a closed top, sidewall, and bottom opening, and c) a substantially solid transparent deflector plate elevated over the top opening of the base, said deflector plate having a diameter greater than a diameter of the top opening of the base;

wherein the transparent enclosure attaches to the base such that the top opening of the base opens into the interior of the transparent enclosure; said deflector plate extending beyond the edge of the top opening of the base and attached to the base by supports such that the plate is spaced from the top opening of the base, from the sidewall of the transparent enclosure, and below the closed top of the transparent enclosure.

4. The insect trap and monitoring device of claim 3, wherein the transparent enclosure is a transparent truncated cone.

5. The insect trap and monitoring device of claim 3 wherein said suitable color to attract whiteflies is yellow.

6. The insect trap and monitoring device of claim 3 wherein a hanging means is attached to the top of the transparent enclosure.

7. The insect trap and monitoring device of claim 3 wherein the base and the transparent enclosure are detachably coupled.

8. An insect trap and monitoring device for whiteflies comprising:

(a) an opaque base of suitable color to attract whiteflies, said base comprising an annular outer wall formed integrally at its lower edge with an annular inner wall such that a trough is formed between the inner and outer walls and a top opening and a bottom opening are formed, wherein the top opening is smaller than the bottom opening;

(b) a transparent hollow upper enclosure with a closed top, sidewall, and bottom opening, said bottom opening being of sufficient size to make a close fit with the outer wall of the base, and (c) a substantially solid transparent deflector plate elevated over the top opening of the base, said deflector plate having a diameter greater than a diameter of the top opening of the base;

wherein the upper enclosure attaches to the base such that the top opening of the base opens into the interior of the upper enclosure; said deflector plate extending beyond the edge of the top opening of the base and attached to the base by supports such that the plate is spaced from the top opening of the base, from the sidewall of the transparent enclosure, and below the closed top of the transparent enclosure.

9. The insect trap and monitoring device of claim 8, wherein the transparent hollow upper enclosure is a truncated cone.

10. The insect trap and monitoring device of claim 8, wherein said suitable color to attract whiteflies is yellow.

11. The insect trap and monitoring device of claim 8, wherein a hanging means is attached to the top of the transparent enclosure.

12. The insect trap and monitoring device of claim 8 wherein the base and upper enclosure are detachably coupled.

* * * * *